United States Patent
Conflitti et al.

(10) Patent No.: US 6,279,192 B1
(45) Date of Patent: Aug. 28, 2001

(54) VEHICLE WINDSHIELD WIPER ASSEMBLY INCORPORATING CABLE AND PULLEY DRIVE SYSTEM AND REMOTE POSITIONED ELECTRIC MOTOR

(75) Inventors: Marey C. Conflitti; Robert S. Shank, both of Sterling Heights, MI (US)

(73) Assignee: Norwood Enterprise, LLC, Sterling Heights, MI (US)

( * ) Notice: Subject to any disclaimer, the term of this patent is extended or adjusted under 35 U.S.C. 154(b) by 0 days.

(21) Appl. No.: 09/484,828

(22) Filed: Jan. 18, 2000

Related U.S. Application Data

(63) Continuation-in-part of application No. 09/454,012, filed on Dec. 3, 1999, which is a continuation-in-part of application No. 09/394,492, filed on Sep. 13, 1999.

(51) Int. Cl.$^7$ .................. B60S 1/20; B60S 1/18
(52) U.S. Cl. .................. 15/250.25; 15/250.27; 74/43; 74/37
(58) Field of Search .............. 15/250.25, 250.3, 15/250.31, 250.27; 74/501.5 R, 42, 43, 96, 500.5, 37

(56) References Cited

U.S. PATENT DOCUMENTS

| | | |
|---|---|---|
| 2,431,570 | * 11/1947 | Landon . |
| 2,568,922 | * 9/1951 | Malone . |
| 2,995,766 | * 8/1961 | Kuhn . |
| 3,788,681 | 1/1974 | Barenyi et al. . |
| 3,842,460 | * 10/1974 | Wulf . |
| 4,418,440 | 12/1983 | Sigety, Jr. . |
| 4,783,876 | 11/1988 | Souma et al. . |
| 4,898,046 | * 2/1990 | Mancewicz et al. . |
| 4,938,526 | 7/1990 | Sannomiya et al. . |
| 5,050,442 | * 9/1991 | Reed . |
| 5,068,942 | 12/1991 | Vrettos . |
| 5,074,613 | 12/1991 | Unterborn et al. . |
| 5,755,140 | 5/1998 | Turbessi et al. . |

FOREIGN PATENT DOCUMENTS

| | | | |
|---|---|---|---|
| 2155028 | * 5/1973 | (DE) | .................. 15/250.27 |
| 2312630 | * 10/1974 | (DE) | . |
| 2130476 | * 6/1984 | (GB) | . |
| 481141 | * 5/1953 | (IT) | . |
| 60-197450 | * 10/1985 | (JP) | .................. 15/250.25 |
| 276825 | * 10/1996 | (JP) | .................. 15/250.25 |

* cited by examiner

*Primary Examiner*—Gary K. Graham
(74) *Attorney, Agent, or Firm*—Gifford, Krass, Groh, Sprinkle, Anderson & Citkowski, P.C.

(57) ABSTRACT

A windshield wiper assembly for use in a motor vehicle. An electric motor is operatively connected to and powered by an on-board electrical supply provided by the vehicle. The motor forms a part of a housing mounted within an engine compartment of the vehicle at a location remote from the vehicles windshield. A driving wheel and linkage member convert a rotary output of the motor into a translating and reciprocating driving force. A drive mechanism is mounted proximate a lower edge of the windshield, beneath a cowl portion, and with a first wiper arm pivotally securing to the drive mechanism at a first location and a second wiper arm likewise pivotally securing to the drive mechanism at a second location. An elongated and internally hollowed sleeve extends between the housing and the drive mechanism. The sleeve encloses a flexible and incompressible cable securing to the motor and drive housing at a first end and to the drive mechanism at a second end. The cable is acted upon by the driving wheel and linkage of the housing and imparts the reciprocating and translating driving force to the gear and belt arrangement of the drive mechanism. The drive mechanism further includes high strength and resilient reciprocating structure to operate the wiper arms and blades without fear of material wearing or fatigue and so as to permit mounting of the motor and housing within the engine compartment at a location remote from the firewall separating the occupant compartment.

6 Claims, 5 Drawing Sheets

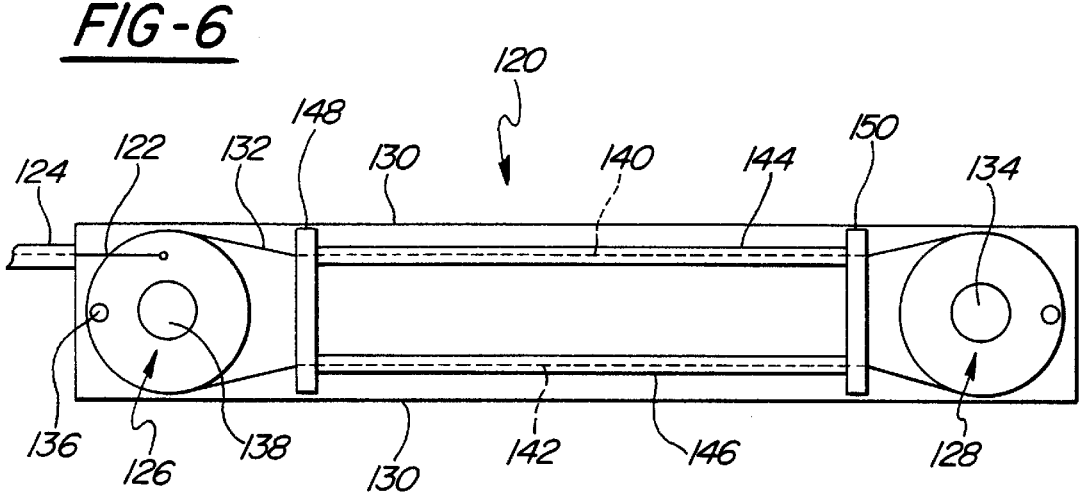
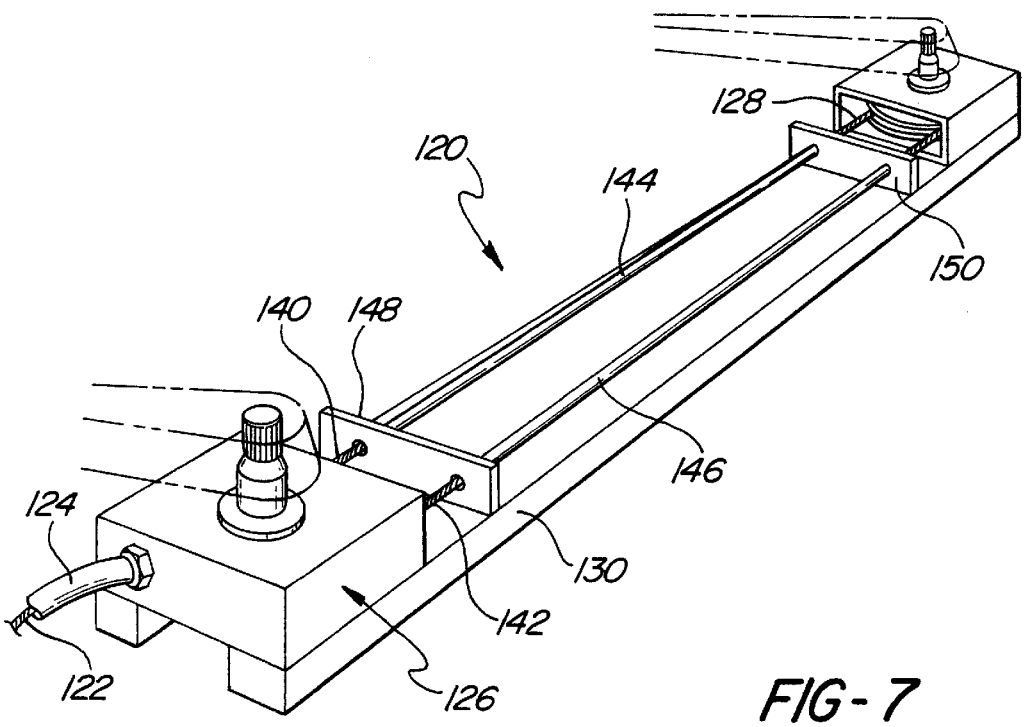

VEHICLE WINDSHIELD WIPER ASSEMBLY INCORPORATING CABLE AND PULLEY DRIVE SYSTEM AND REMOTE POSITIONED ELECTRIC MOTOR

CROSS REFERENCE TO RELATED APPLICATIONS

The present application is a continuation-in-part of U.S. application Ser. No. 09/454,012, filed Dec. 3, 1999, for a Vehicle Windshield Wiper Assembly Incorporating Cable and Pulley Drive System and Remote Positioned Motor, and which is in turn a continuation-in-part of U.S. application Ser. No. 09/394,492, filed Sep. 13, 1999 for a Vehicle Windshield Wiper Assembly Incorporating Cable and Pulley Drive System and Remote Positioned Electric Motor.

BACKGROUND OF THE INVENTION

1. Field of the Invention

The present invention relates generally to windshield wiper assemblies and, more particularly, to a wiper assembly for use with a vehicle which incorporates a cable and pulley drive system and which permits positioning of the electric motor at a remote location from the interior cabin for driving the wiper assembly and for reducing cabin noise.

2. Description of the Prior Art

Standard vehicle windshield wiper assemblies are well known in the art. The purpose behind such assemblies, as is clearly evident, is to remove accumulations of rain, dirt or other impediments which would otherwise affect the ability of the driver to clearly view the area in front of the vehicle windshield.

One of the more well known prior art windshield wiper assemblies contemplates the use of an electric motor mounted in close proximity to a firewall of the vehicle and for operatively engaging a steel linkage arm. The linkage arm in turn engages first and second wiper arms at respective ends of the linkage arm and, responsive to the driving force of the motor, actuates the wiper arms in reciprocating fashion. The shortcomings of this conventional design are twofold. Firstly, the steel linkage arm can tend to deflect during operation, resulting in the respective wiper arms reciprocating in less than a desired synchronous manner. Secondly, the requirements of the mechanical linkage connection between the motor and the linkage arm are such that the motor must be mounted in fairly close proximity to the vehicle firewall and windshield; thus the sounds of the motor are clearly audible to the occupants within the vehicle.

Additional variants of prior art wiper assemblies are further illustrated in U.S. Pat. No. 5,755,140, issued to Turbessi et al., U.S. Pat. No. 4,418,440, issued to Sigety, Jr., and U.S. Pat. No. 5,068, 942, issued to Vrettos. It is of interest to note that Turbessi teaches the use of a cable and lever arm arrangement for converting a motor output to a reciprocating driving force for the wiper arms. Vrettos is further interesting in that it teaches an endless belt positioned beneath a windshield and extending the width of the windshield. A wiper is attached to the belt on its inner side and the belt, when fully extended, defines an inner space large enough to accommodate the wiper.

SUMMARY OF THE PRESENT INVENTION

The present invention teaches a windshield wiper assembly for use in a motor vehicle, and which specifically provides the dual features of permitting remote mounting of the motor at a location distant from the vehicle firewall (and the vehicle occupant compartment), as well as for maintaining precise and synchronous movement of the first and second wiper arms. The vehicle includes an engine compartment which is capable of generating an onboard electrical power supply, an occupant compartment, and a windshield extending upwardly from a location contiguous the firewall separating the engine compartment and the occupant compartment.

Elements of the wiper assembly include an electric motor operatively connected to and powered by the on-board electrical supply. The motor forms a part of a housing mounted within the engine compartment at a location remote from the windshield, and typically to a sidewall defining portion of the vehicle's engine compartment. The housing including a driving wheel operatively engaged to the motor output and rotatable about a first shaft, the drive wheel in turn actuating an elongate and freely rotatably mounted linkage member. The linkage member engages at a remote end a driven member which is likewise rotatably mounted to the housing at a further location and along an axis of rotation parallel to an axis of rotation defined by the first shaft. The housing operates to convert an output of said motor into a reciprocating and translating driving force.

A drive mechanism is mounted proximate a lower edge of the windshield and includes an elongate body having a length, a width and a height. First and second gears are rotatably secured at first and second locations along the length of the drive mechanism. An elongate and closed loop timing belt is secured over the gears and, due to an interengaging and toothed arrangement of the gears and belt, the belt precisely rotates the second gear, responsive to rotation of the first gear, in a precise and synchronous manner. A first wiper arm pivotally secures to a first pin also mounting the first gear and a second wiper arm likewise pivotally secures to a second pin also mounting the second gear of the drive mechanism. Each of the first and second wiper arms further includes an elongate wiper blade which overlays and contacts an exterior face of the windshield;

At least one elongated and internally hollowed sleeve extends between the motor and drive housing and the wiper blade drive mechanism. A preferred embodiment teaches first and second sleeves each enclosing a flexible and incompressible cable securing to the housing at a first end and to the drive mechanism at a second end. The cables connect at respective locations to the driven member rotatably secured in the housing (either another wheel or a pivotally mounted and elongate plate) and respond by being translated internally in reciprocating fashion within the respectively mounted outer sleeves. The cables impart the reciprocating and translating driving force to a circular disk rotatably secured in coaxial fashion to the first gear of the drive mechanism to cause the first gear to rotate in reciprocating manner and, by virtue of the timing belt, to cause the second gear to identically actuate and to thereby operate the first and second wiper arms and blades in the desired synchronous manner.

According to a yet further preferred embodiment, the drive mechanism may further employ a steel braided cable which is looped around the gears rotatably secured at opposite ends of the elongate drive housing. The parallel extending and spaced apart lengths of the cable are slidably maintained within first and second spaced apart and fixed cable containing conduits. The conduits extend along a selected intermediate running length of the drive housing and do not contact either of the gear members. The purpose of the conduits and steel braided cable is to provide an arguably much stronger reciprocating drive which will not stress fatigue or fail over extended use. This arrangement is in substitution for the closed belt timing loop utilized in the first preferred embodiment.

According to a yet additional embodiment, the first and second cables and fixed conduits are substituted by a single connecting rod, constructed of a steel or other durable and deflection resistant material. The connecting rod secures at first and second respective ends to the first and second gear members and is in substitution of either the closed belt timing loop of the initial embodiment or the steel braided cable and fixed conduits of the previously and additional preferred embodiment. As with the braided cable and conduit arrangement, the substitution of the connecting rod between the gear members is asserted to greatly increase the strength and durability of the reciprocating drive mechanism driving the wiper blades over time and to greatly decrease the likelihood of stress fatigue or failure.

BRIEF DESCRIPTION OF THE DRAWINGS

Reference will now be made to the attached drawings, when read in combination with the following specification, wherein like reference numerals refer to like parts throughout the several views, and in which:

FIG. 6 is a view of the drive mechanism according to a further preferred embodiment of the present invention;

FIG. 7 is a perspective of the drive mechanism illustrated in FIG. 6 and showing in greater detail the steel braided cable looped about the gears and slidably restrained within the first and second spaced apart conduit sections;

DESCRIPTION OF THE PREFERRED EMBODIMENTS

Figure 1:
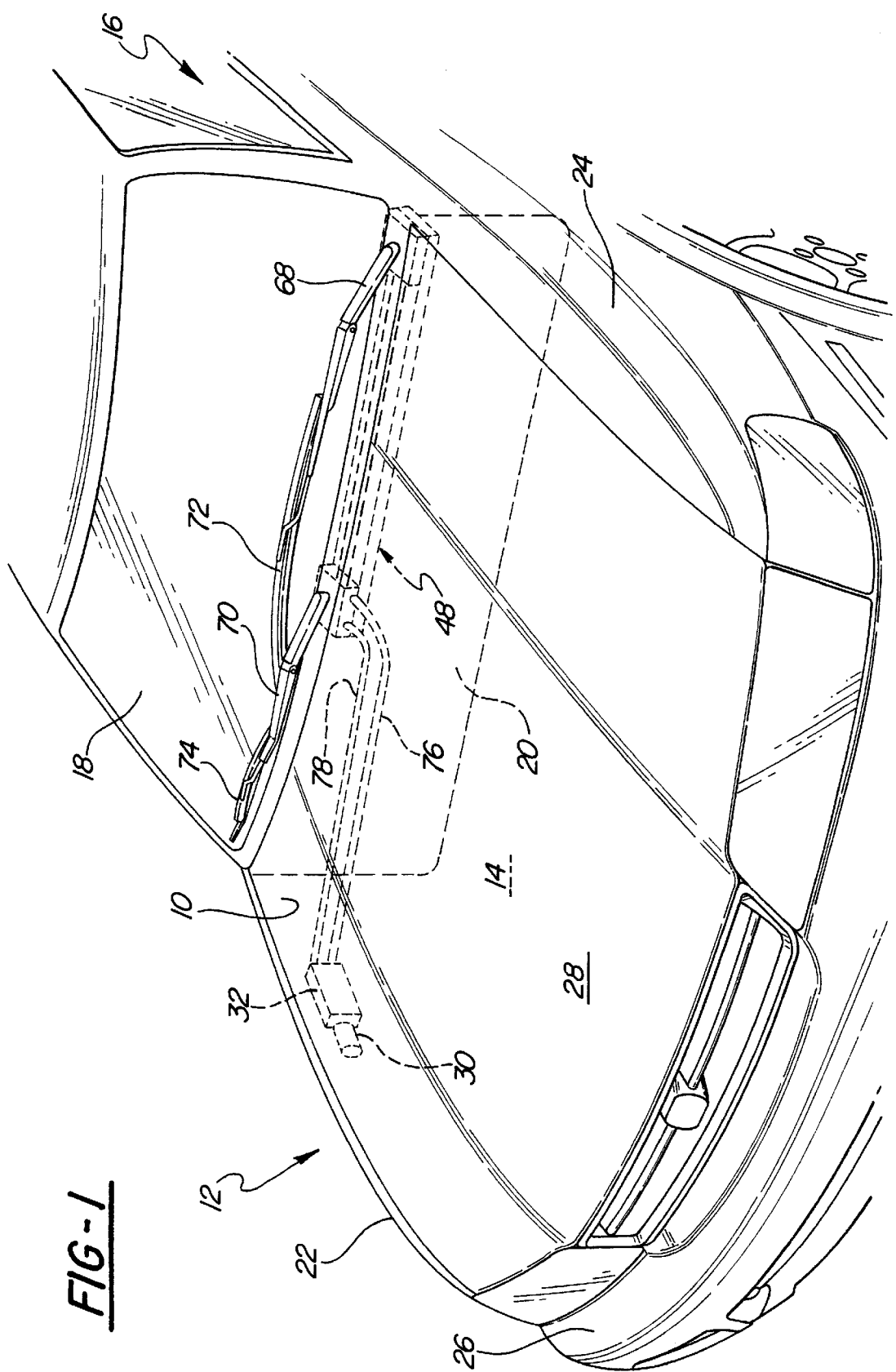
FIG. 1 is an operational view of a vehicle and illustrating in phantom the location of the wiper assembly according to a first preferred embodiment of the present invention.

Referring to FIG. 1, an operational view of a windshield wiper assembly is shown in phantom at 10 for use in a vehicle 12 according to a first preferred embodiment of the present invention. The vehicle 12 is of conventional design and includes an engine compartment 14 which is capable of generating an on-board electrical power supply, such as by virtue of an alternator and battery, such elements being well known in the art and therefore not needing further explanation. The vehicle further includes an occupant compartment 16 and a windshield 18 extending upwardly from a location contiguous a firewall 20 separating the engine compartment 14 and the occupant compartment 16. The vehicle is further defined in part by first and second side walls 22 and 24 and a front bumper end 26. A hood 28 covers the engine compartment as is also well known.

Figure 2:
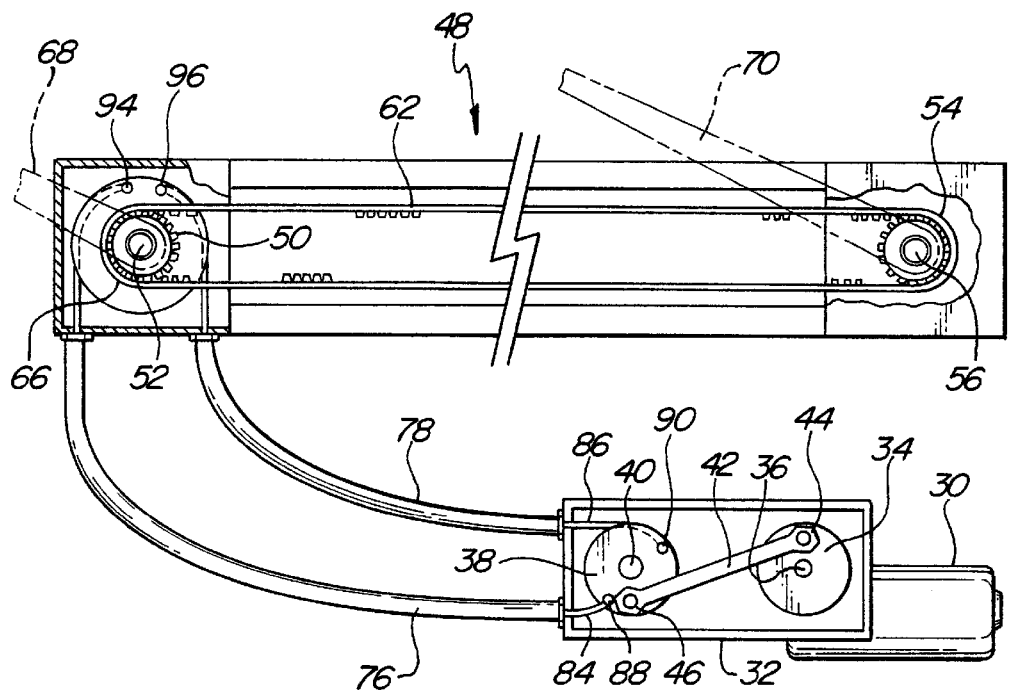
FIG. 2 is a view of the windshield wiper assembly according to the present invention and illustrating in cutaway a first preferred embodiment for generating the reciprocating and translational driving force from the motor and housing through the use of a pair of sleeve and cable members.

Referring again to FIG. 1, as well as to FIG. 2, an electric motor 30 is illustrated and which is understood to be operatively connected to and powered by the on-board electrical supply of the vehicle 12. The motor 30 forms a part of a housing 32 mounted within the engine compartment at a location remote from the windshield 18, such location being in one embodiment along an inner facing surface of the vehicle side wall 22. The housing 32 includes a conversion mechanism for converting an output of the motor 30 into a reciprocating and translating driving force.

Specifically, and referring to FIG. 2, a driving wheel 34 is operatively connected to the motor 30 and is rotatable about a first shaft 36. Although not shown in FIG. 2, it is understood that a traditional bevel gear arrangement or the like can be employed for transferring a rotary output from a shaft extending from the electric motor housing (also not shown) to the first shaft 36. A driven member 38 is rotatably mounted to said housing about a second shaft 40 a spaced location from the driving wheel 34 and the second shaft 40 defines an axis of rotation parallel to an axis of rotation defined by the first shaft 36. The driven member 38 according to the first embodiment is a second wheel however, as will be further described with the embodiment of FIG. 5, other types of driven members may be employed without departing from the scope of the instant invention.

An elongate linkage member 42 is rotatably mounted to an outer radial location 44 of the driving wheel 34 (such as through the use of a rotating bearing assembly or the like) at a first end and to a likewise outer radial location 46 of the driven member 38 at a second end. The linkage member 42 is actuated in a circular pattern resulting from the reciprocating motion imparted by the driving wheel 34 (itself in response to the actuation of the electric motor 30) and results in likewise rotating the driven member 38 or wheel in likewise fashion.

Figure 3:
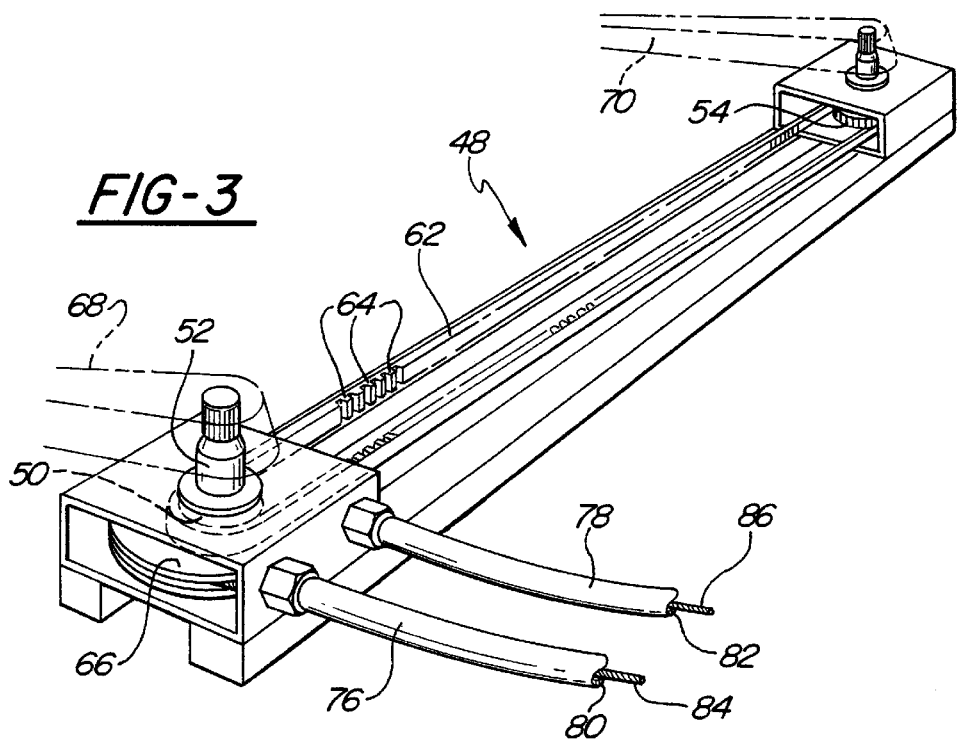
FIG. 3 is a partial view of the drive mechanism according to the first preferred embodiment.
Figure 4:
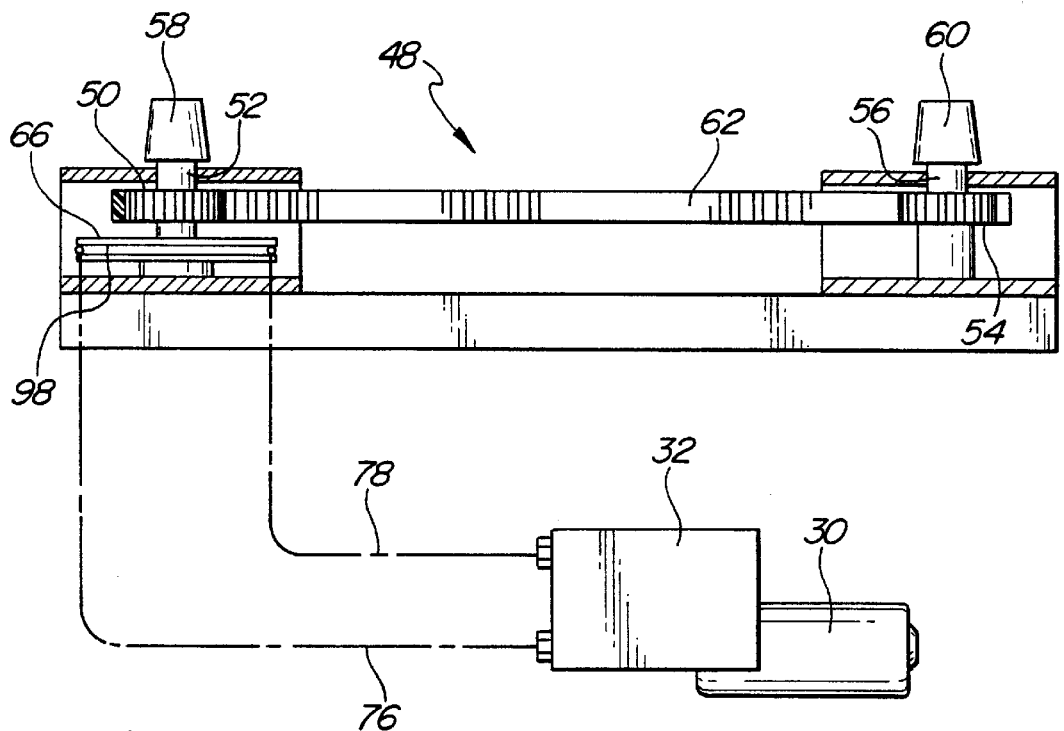
FIG. 4 is a view illustrating the drive mechanism rotated ninety degrees to a side view and in cutaway fashion.

Referring again to FIGS. 1 and 2, and also to FIGS. 3 and 4, a drive mechanism 48 is provided and includes a length, a width and a height. The drive mechanism is preferably of an elongate rectangular and three dimensional shape and is mounted proximate a lower edge of the vehicle windshield 18 and within the engine compartment 14.

The drive mechanism 48 further includes a first externally toothed gear 50 rotatably secured to a first pin 52 at a first end location. A second externally toothed gear 54 rotatably secured to a second pin 56 at a second end location. Each of the pins includes a capped end portion, at 58 for first pin 52 and at 60 for second pin 56 (see side view of FIG. 4). An elongate and closed loop timing belt 62 is provided having a toothed inner surface 64. The belt 62 mounts at opposite ends about the externally toothed gears 50 and 54 such that the continuous loop and toothed inner surface 64 interengages with the externally toothed gears. The belt 62 is typically constructed of a heavy-duty rubberized material, however it can also be produced with any other material exhibiting the necessary properties of flexibility and resiliency. The purpose of the belt is to drive the second toothed gear 54 in a precise and synchronized manner with respect to driven rotation of the first toothed gear 50 and as will be further explained. A circular disk 66 is likewise rotatably secured about the first pin 52 in a laterally spaced and generally coaxial fashion relative to the first toothed gear 50

(see specifically FIG. 4). The operation of the circular disk 66 will be further explained.

A first wiper arm 68 is pivotally secured to the first pin 52 of the drive mechanism at the first location and in a conventional manner and a second wiper arm 70 is likewise pivotally secured at a second location. Each of the first and second wiper arms 68 and 70 further includes an elongate wiper blade, see at 72 and 74, respectively in FIG. 1, and which overlays and contacts an exterior face of the windshield 18.

First and second elongated and internally hollowed sleeves 76 and 78 are provided and extend between a selected end location of the housing 32 and the drive mechanism 48. The sleeves 76 and 78 are preferably constructed of a steel conduit or like material exhibiting the necessary properties of strength and may further be either fixed or laterally flexible to some degree. The annular interior of the sleeves 76 and 78 may further be encapsulated with a nylon coating (see at 80 and 82 in FIG. 3) and for a purpose to now be described.

First and second flexible and incompressible cables 84 and 86 are encased within the first and second sleeves 76 and 78, respectively. The first and second cables 84 and 86 secure at selected (outer radial locations 88 and 90 (see again FIG. 2) of the second and driven wheel 38 within the housing 32 and at first ends of the cables. An outer circumferential and channeled recess 92 is formed in said driven wheel 38 (see phantom designation of end portion of second cable 86 in FIG. 2) and guidingly receives therein the selected first end portions of the first and second cables 84 and 86 during reciprocal and driven rotation of said driven wheel 38. The cables 84 and 86 likewise secure to further selected radial locations 94 and 06 of the circular disk 66 in the drive mechanism (FIG. 2), the disk 66 likewise possessing an outer circumferential and channeled recess 98 (FIG. 4) formed thereabout and guidingly receiving selected end portions of the cables 84 and 86 during likewise reciprocal and driven rotation of the disk by the cables.

The advantage of the conduit sleeves 76 and 78 and encased cables 84 and 86 is that it permits the rotational driven force imparted to the driven wheel 38 to be imparted to the cables 84 and 86 which translate within the nylon coated sleeves 76 and 78. The cables 84 and 86 impart the translational and reciprocating force to the disk 66 mounted to the first pin 52 along with the first toothed gear 50. The gear 50 is thus made to rotate, along with the pin 52 and the attached first wiper arm 68, and the belt 62 causes the second toothed gear 52 and the attached second wiper arm 70 to likewise actuate in the desired and synchronized fashion.

Figure 5:
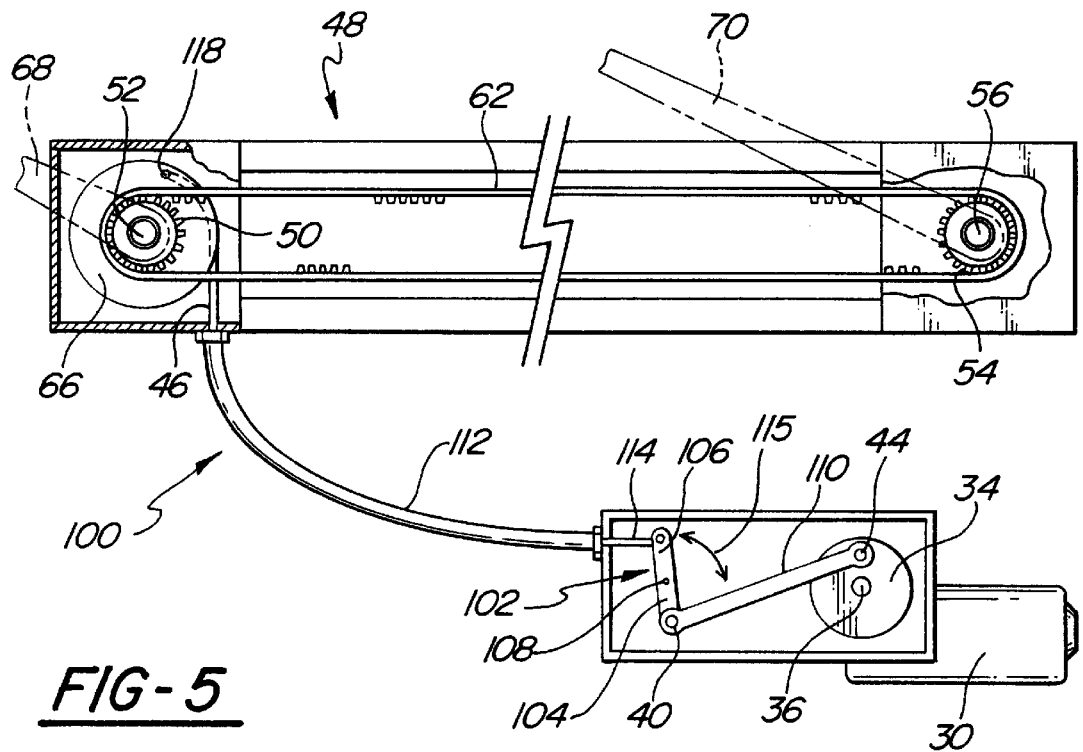
FIG. 5 is a view similar to that shown in FIG. 2 and illustrating windshield wiper assembly according to a second preferred embodiment in which a single sleeve and cable member actuates the drive mechanism.

Referring to FIG. 5, a view similar to FIG. 2 is shown of a windshield wiper assembly 100 according to a second preferred embodiment. The embodiment of FIG. 5 is largely similar to that shown in FIGS. 1–4, with the exception of the following particular description.

The driven member in FIG. 5 substitutes the driven wheel 38 with an elongate plate 102 having a first end 104 and a second end 106, the ends extending from opposite sides of second shaft 108, which again rotates about an axis parallel and spaced from the first shaft 36 corresponding to the driving wheel 34. A linkage member 110 secures to the driving wheel 34 in an outer radial and rotating fashion, as shown at 44 and just as in the first preferred embodiment. Likewise, the linkage member 110 secures to the second end 106 of the elongate plate 102 on a side opposite the second shaft 108.

A single elongated and internally hollowed sleeve or conduit 112 is employed in the variant of FIG. 5, connected at one end to the motor and drive housing and at the other to the drive mechanism for the wiper arms. A single flexible and incompressible cable is provided and is received within the hollow interior of the conduit 112. The cable connects to the drive housing at a first end 114 (securing to the second end 106 of the elongate plate 102) and to the drive mechanism at a second end 116 (which secures to an outer radial location 118 of the disk 66 just as shown by the first and second cables of the first preferred embodiment) and is capable of being slidingly translated as a result of pivoting actuation of the elongate plate 102, in the directions indicated by arrow 115.

Referring now to FIGS. 6 and 7, a further variant of the drive mechanism is illustrated at 120 according to the windshield wiper assembly of the present invention. According to the yet further preferred embodiment, the drive mechanism 120 utilizes a cable 122 slidably extending within sleeve 124 which extends from the motor and drive housing (not illustrated but identical to those described in the first preferred embodiments). The cable 122 may be constructed similarly to those described at 76 and 78 in FIG. 3 and may also be constructed of a steel braided material to increase its strength and durability.

First and second gears 126 and 128 are provided and are rotatably secured at opposite ends of elongate drive housing 130. The first gear 126 is rotatably driven by a female splined shaft 132 and the second gear 128 is freely rotatably mounted at 134. A cable detent 136 is also illustrated at 136.

A further steel braided cable 138 is looped around the first and second gears 126 and 128. The gears are once again suitably configured so that they define inwardly channeled sides for guidable restraining the looped cable 138. The cable 138 is mounted so that it defines first and second parallel running lengths 140 and 142 extending in spaced apart fashion and between the first gear 126 and the second gear 128.

The parallel running lengths 140 and 142 of the looped cable are slidably maintained within first and second spaced apart and fixed cable containing conduits 144 and 146. The conduits 144 and 146 may also be provided with a non-slip interior nylon coating and each extends a selected intermediate running length of the drive housing 130 between the first and second gears 126 and 128 without contacting either of the gear members. The conduits 144 and 146 are secured in place upon the drive mechanism housing 130 by a first rectangular shaped support block 148 arranged in proximity to the first gear 126 and a second rectangular shaped support block 150 arranged in proximity to the second gear 128. As best shown in FIG. 7, the first and second support blocks 148 and 150 (as best illustrated by the perspective on block 148) are apertured in aligning fashion with the first and second mounted conduit sections 144 and 146 and so that the parallel running lengths of the conduit 140 and 142 may extend therethrough.

The purpose of the conduits and steel braided cable is to provide an arguably much stronger reciprocating drive and which will not stress fatigue or fail over extended use. This arrangement is in substitution for the closed belt timing loop utilized in the first preferred embodiment which, by itself, provides a considerable degree of resiliency.

Figure 8:
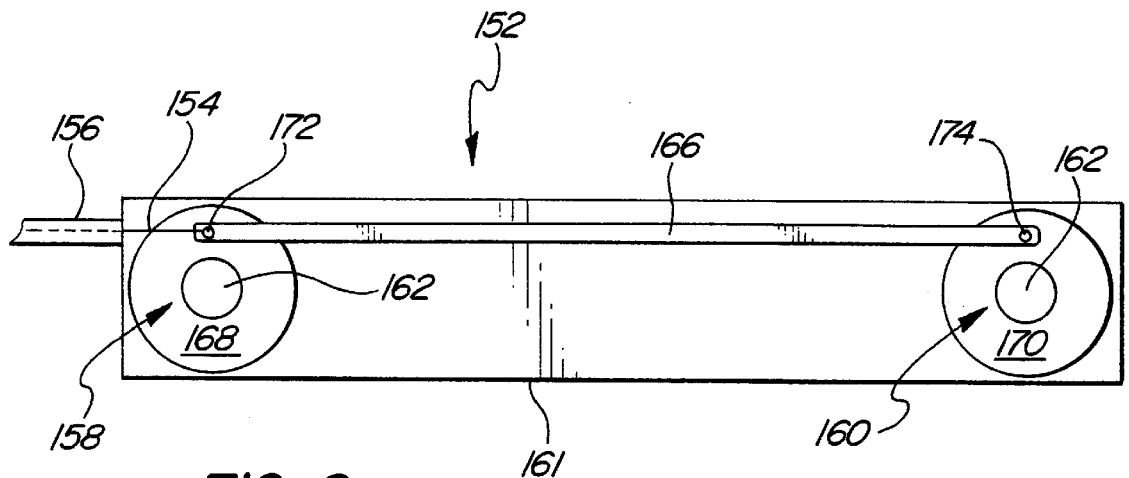
FIG. 8 is a view of the drive mechanism according to a yet further preferred embodiment of the present invention.
Figure 9:
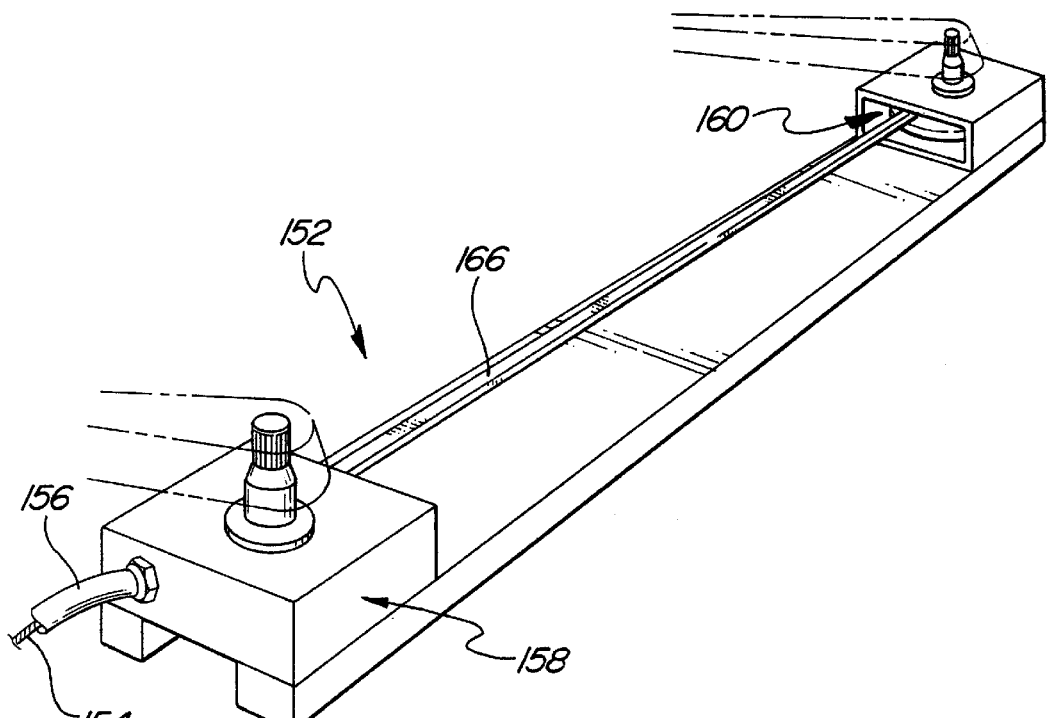
FIG. 9 is a perspective of the drive mechanism illustrated in FIG. 8 and showing in greater detail the connecting rod secured to planar faces of the first and second gears.

Referring finally to FIGS. 8 and 9, a yet further variant is illustrated of the drive mechanism, at 152, according to the windshield wiper assembly of the present invention. According to the yet further preferred embodiment, the drive mechanism 120 also utilizes a cable 154 slidably extending within sleeve 156 which extends from the motor and drive housing (again not illustrated but identical to those described in the first preferred embodiments). The cable 154 may again be constructed similarly to those described at 76 and 78 in FIG. 3 and is likewise preferably constructed of a steel braided material to increase its strength and durability.

First and second gears 158 and 160 are provided and are rotatably secured at opposite ends of elongate drive housing 161. The first gear 158 is rotatably driven by a female splined shaft 162 and the second gear 160 is freely rotatably mounted at 164.

According to the yet additional embodiment, the first and second cables and fixed conduits taught in FIGS. 6 and 7 are substituted by a single rigid connecting rod 166, constructed of a steel or other durable and deflection resistant material. The connecting rod 166 secures in rotatable fashion at first and second respective ends to planar end faces 168 and 170 of the first and second gear members 158 and 160, respectively. Reciprocating action is imparted by the cable 154, best illustrated in the view of FIG. 8 and connects to a common rotating pin 172 of the first gear 158 to which is mounted a first end of the connecting rod 166. An opposite end of the rod 166 likewise is mounted to the second gear 160 by means of a similarly configured rotating pin 174.

The connecting rod variant is in substitution of either the closed belt timing loop of the initial embodiment or the steel braided cable and fixed conduits of the previously and additional preferred embodiment. As with the braided cable and conduit arrangement, the substitution of the connecting rod between the gear members is asserted to greatly increase the strength and durability of the reciprocating drive mechanism driving the wiper blades over time and to greatly decrease the likelihood of stress fatigue or failure.

Having described our invention, it will become apparent that it teaches a novel and unique windshield wiper assembly which provides for precise and synchronous actuation of the wiper arms and which also permits the positioning of the electrical motor and drive housing at a location remote from the drive mechanism. Additional embodiments will become apparent to those skilled in the art to which it pertains and without deviating from the scope of the appended claims.

I claim:

1. A windshield wiper assembly for use in a motor vehicle, the vehicle including an engine compartment which is capable of generating an on-board electrical power supply, an occupant compartment, and a windshield extending upwardly from a location contiguous a firewall separating the engine compartment and the occupant compartment, said wiper assembly comprising:

an electric motor operatively connected to and powered by the on-board electrical supply, said motor forming a part of a housing mounted within the engine compartment at a location remote from the windshield, said housing including a conversion means for converting an output of said motor into a reciprocating and translating driving force;

said assembly further including a drive mechanism mounted proximate a lower edge of the windshield and including an elongate body having a length, a width and a height, a first wiper arm pivotally securing to said drive mechanism at a first location and a second wiper arm likewise pivotally securing to said drive mechanism at a second location, each of said first and second wiper arms further including an elongate wiper blade which overlays and contacts an exterior face of the windshield;

said drive mechanism including actuating means for driving said first and second wiper arms in a synchronized manner;

an elongated and internally hollowed sleeve extending between said housing and said drive mechanism, said sleeve enclosing an incompressible cable securing to said conversion means of said housing at a first end and to said actuating means of said drive mechanism at a second end;

said drive mechanism further including a first gear mounted at a first end and in operative communication with said cable, a second gear being mounted at a second end of said drive mechanism body;

said actuating means further including a steel braided cable looped around said first and second gears, said looped cable including first and second straight extending portions which extend between said first and second gears, first and second fixed and internally hollowed conduits being mounted upon said drive mechanism between said first and second gears and receiving said first and second straight extending portions therethrough; and said incompresssible cable being acted upon by said conversion means and imparting said reciprocating and translating driving force to said drive mechanism to operate said wiper arms and blades in a continuous and synchronized manner.

2. The windshield wiper assembly according to claim 1, said housing capable of being secured to a location along the vehicle firewall.

3. The windshield wiper assembly according to claim 1, the vehicle engine compartment further being defined by first and second side walls, said housing capable of being secured to a location along one of the side walls.

4. The windshield wiper assembly according to claim 1, said elongate and internally hollowed sleeve being constructed of a steel conduit and encapsulated with nylon for slidingly receiving said cables.

5. A windshield wiper assembly for use in a motor vehicle, the vehicle including an engine compartment which is capable of generating an on-board electrical power supply, an occupant compartment, and a windshield extending upwardly from a location contiguous a firewall separating the engine compartment and the occupant compartment, said wiper assembly comprising:

an electric motor operatively connected to and powered by the on-board electrical supply, said motor forming a part of a housing mounted within the engine compartment at a location remote from the windshield, said housing including a conversion means for converting an output of said motor into a reciprocating and translating driving force;

said assembly further including a drive mechanism mounted proximate a lower edge of the windshield and including an elongate body having a length, a width and a height, a first wiper arm pivotally securing to said drive mechanism at a first location and a second wiper arm likewise pivotally securing to said drive mechanism at a second location, each of said first and second wiper arms further including an elongate wiper blade which overlays and contacts an exterior face of the windshield;

said drive mechanism including actuating means for driving said first and second wiper arms in a synchronized manner;

an elongated and internally hollowed sleeve extending between said housing and said drive mechanism, said sleeve enclosing an incompressible cable securing to said conversion means of said housing at a first end and to said actuating means of said drive mechanism at a second end;

said drive mechanism further including a first gear mounted at a first end and in operative communication with said cable, a second gear being mounted at a second end of said drive mechanism body, said actuating means further including a rigid connecting rod securing rotatably at a first end to an end face of said first gear and rotatably securing at a second end to an end face of said second gear; and said cable being acted upon by said conversion means and imparting said reciprocating and translating driving force to said drive mechanism to operate said wiper arms and blades in a continuous and synchronized manner.

6. The windshield wiper assembly according to claim 5, further comprising first and second rotating pins to which said connecting rod secures at opposite ends, said incompressible cable also securing to said first rotating pin located in said first gear.

* * * * *